Dec. 13, 1966 L. M. CARVER 3,292,087

SIGNAL MONITORING AND SWITCHING CIRCUITS
FOR A TERMINAL FACILITY

Filed Sept. 24, 1963 3 Sheets-Sheet 1

INVENTOR
LAWRENCE M. CARVER

BY

OSTROLENK, FABER, GERB & SOFFEN

ATTORNEYS

INVENTOR.
LAWRENCE M. CARVER

BY

OSTROLENK, FABER, GERB & SOFFEN

ATTORNEYS

United States Patent Office 3,292,087

Patented Dec. 13, 1966

3,292,087
SIGNAL MONITORING AND SWITCHING CIRCUITS FOR A TERMINAL FACILITY

Lawrence M. Carver, Stamford, Conn., assignor to Stelma Incorporated, Stamford, Conn., a corporation of Connecticut Filed Sept. 24, 1963, Ser. No. 311,086
10 Claims. (Cl. 325—64)

This invention relates to communications systems and more particularly to a novel terminal facility for connecting a two-wire telephone line to a four-wire radio circuit wherein the terminal provides automatic selection of transmission direction under control of the two-wire line as well as providing four-wire to four-wire operation.

In communications systems for two-wire to four-wire operation, control over transmission direction is obtained by providing the terminal facility with tone controlled relay means which receives from the four-wire circuit or transmits to the four-wire terminal under control of specified tones delivered by the four-wire circuit. With voice transmission in the 300 to 3000 c.p.s. frequency range a portion of this band is reserved for the control tones. The terminal facility passes only the reserved frequency band to the tone controlled relay means and rejects the reserved band from the terminal means receiving amplifier so as not to interfere with normal incoming voice signals.

The receiving amplifier is designed to control the amplitude of incoming voice signals which vary continuously due to fading which may be due to atmospheric conditions, a change in the transmission path length, et cetera.

When the radio circuit desires to transmit to the two-wire line the specified tone is transmitted to the terminal facility which tone is followed by the voice signals. The receiver amplifier then adjusts the incoming voice signals to the preset amplitude. Since the receiver amplifier has no ability to distinguish between high or low level voice signals or pure noise, if pure noise is impressed upon the receiver amplifier it undergoes maximum gain thereby passing an extremely loud noise signal to the telephone line.

If the incoming signals are voice signals of low amplitude, the receiver amplifier in raising the signals to the desired level experiences an overshoot introducing a "blast" into the two-wire line as well as bellowing effect caused by the amplifier in hunting the preset voice signal amplitude.

The receive amplifier means, in operating upon signals of extremely low amplitude level, lacks the ability to differentiate between low level voice signals and noise signals, thus attempting to impose maximum gain on such incoming signals, thereby impressing extremely poor quality signals upon the telephone line.

The instant invention provides novel means for indicating marginal operation of the receive channel in order to enable the operator to terminate communications due to the poor quality of the communications channel.

The instant invention comprises a terminal facility having a receive and a send terminal for the radio circuit and a two-way terminal for the telephone circuit. The receive terminal includes band reject filter means for passing all but the reserved frequency band of voice signals to the amplifier circuit which provides voice signals of suitable amplitude for the two-way circuit. A second path connected to the receive terminal is comprised of band pass filter means for passing only the reserved frequency band to the tone controlled relay means.

In the idle position, the radio circuit transmits a first frequency shift tone which lies in the reserved frequency band. This signal is incapable of operating the relay means causing the two-way terminal to remain connected to the send terminal. Any voice signals impressed upon the two-way terminal pass through a send amplifier which is in the send terminal path.

When the radio circuit desires to transmit, a second frequency shift tone is sent to the terminal facility, followed by the voice signals. The voice signals transmitted are attenuated in the reserved band by the radio circuit while the control tones are limited to the reserved band. The second frequency shift tone, while rejected by the terminal facility band reject filter, is passed by the band pass filter to the tone controlled relay means which reacts to the second tone, operating the relay to disconnect the two-way circuit from the send terminal and connect it to the receive terminal.

When the terminal facility is in the voice send condition, voice signals received from the telephone line are imposed upon the send line for transmission to the four-wire radio circuit. Prior to the transition to the send operation, the terminal facility transmits a standby frequency through the radio circuit indicating that no voice transmission is desired. However, upon the initiation of such voice transmission, voice signals from the telephone line are imposed upon amplifier means in the send channel transmission into the radio circuit. Simultaneously, therewith the terminal facility makes a transition from standby frequency to function frequency, which signal is fed into the four-wire send circuit for the purpose of indicating initiation of voice transmission.

Instead of providing a separate means for activating the control frequency generating means to produce the function frequency, the instant invention provides novel control amplifier means which employs the voice signals to be transmitted for the purpose of appropriately activating the control frequency generating means.

The instant invention is comprised of a terminal facility having a receive and a send terminal for the radio circuit and a two-way terminal for the telephone circuit. The receive terminal includes band reject filter means for passing all but the reserve frequency band of voice signals to the amplifier circuit which provides voice signals of suitable amplitude for the two-way circuit. A second path, connected to the receive terminal, is comprised of band pass filter means for passing only the reserve frequency band to the tone control relay means. Receive control detector means is connected to the band pass filter means for the purpose of converting the incoming voice signals to a D.C. voltage. The D.C. voltage is employed for the purpose of operating relay means which is used to control an indicator lamp. The relay means is designed so that when deenergized, the lamp is in the lit condition. However, when the incoming voice signals are of suitable amplitude, the relay means becomes energized to deenergize the indicator lamp. The control detector means is so arranged as to cause the indicator lamp to be lit during marginal operation of the circuit which occurs when the incoming voice signals are at or below the −45 dbm. input level. Thus, if the receive amplifier means is producing an extremely poor quality, the voice signal input level can be immediately determined by observance of the receive control detector means indicator lamp which operates to indicate marginal operation of the terminal facility.

When the terminal facility is operating in the send mode, the voice signals are impressed upon control amplifier means which convert the voice signals to be transmitted into a D.C. voltage level. Since it is possible that the voice signals to be sent from the telephone line to the radio circuit may be in the marginal region, it is advantageous to prevent the terminal facility from generating the function frequency signal until the voice signals are of a suitable voltage level. The output of the control amplifier means is connected to transmit control means circuitry which is normally conditioned to generate the standby frequency signal. A transmit control circuit is provided with trigger circuit means having a preset threshold level, which circuit receives the D.C. output of the control amplifier means. If the D.C. voltage level, representative of the voice signals to be transmitted, is below the threshold level, the trigger circuit fails to change to its unstable condition, thus causing the transmit control circuit to continue the transmission of the standby frequency signal. If, however, the voice signals to be transmitted are of a suitable level, the D.C. voltage level of the control amplifier means is sufficient to operate the trigger circuit to its unstable state, thus causing the transmit control means to generate the function frequency signal indicative of transmission of voice to the radio circuit. The terminal facility is further provided with an indicating lamp whch is energized by the D.C. voltage level when it is above the threshold level to indicate the fact that the terminal facility is in the send condition. The indicator lamp remains energized and the transmit control circuit continues to generate the function frequency as long as the voice signals to be sent remain above the threshold level. However, as soon as these signals fall below the threshold level, the indicator lamp will become deenergized and the transmit control circuit will shift to the transmission of the standby frequency.

It is therefore one object of the instant invention to provide a terminal facility having novel means for indicating marginal operation of the terminal facility receive circuit.

Still another object of the instant invention is to provide a terminal facility for connecting a two-wire telephone line to a four-wire radio circuit wherein novel detector means are provided for producing a visible indication of marginal operation in the receive circuit.

Another object of the instant invention is to provide a terminal facility for connecting a two-wire telephone line to a four-wire radio circuit wherein novel means are provided for generating a signal to indicate the send condition of the terminal facility.

Still another object of the instant invention is to provide a terminal facility for connecting a four-wire radio circuit to a two-wire telephone line wherein the terminal facility send circuit is provided with novel control circuitry for producing a visible indication of the send condition and simultaneously generating a send frequency signal when the voice signals to be sent are above a predetermined threshold level.

Still another object of the instant invention is to provide a novel terminal facility for connecting a four-wire radio circuit to a two-wire telephone line wherein the send circuit of the terminal facility is provided with novel means for converting voice signals to be transmitted to a D.C. level and for utilizing the D.C. level to simultaneously provide a visible indication for the send condition and to cause generation of the send frequency signal.

These as well as other objects of the instant invention will become apparent when reading the accompanying description and drawings in which.

Figure 1:
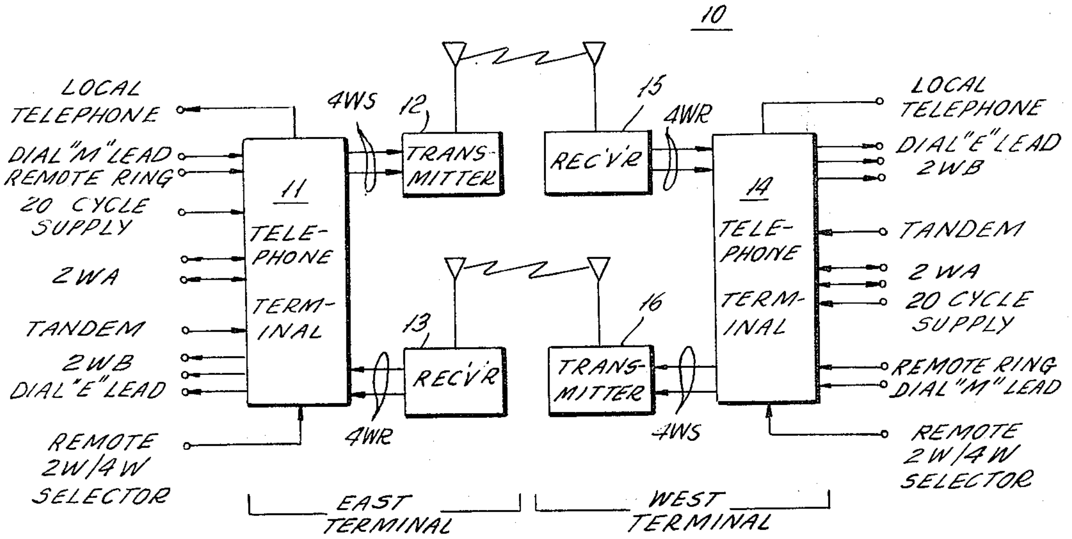
FIGURE 1 is a block diagram of a typical radio link telephone system employing the terminal facility of the instant invention.

Referring now to the drawings FIGURE 1 shows a typical radio link telephone system 10 comprised of an east terminal and a west terminal. The east terminal is provided with a terminal facility 11 for connecting a two-wire telephone line to a four-wire radio circuit. The terminal facility 11 is provided with send terminals 4 WS for impressing voice signals upon transmitter 12. Receive terminals 4 WR impress voice signals from receiver 13 upon terminal facility 11. The west terminal is provided with a like terminal facility receiver and transmitter 14, 15 and 16, respectively, connected in a like manner. Transmitter 12 is connected to transmit signals to receiver 15, while transmitter 16 is arranged to transmit to receiver 13. The receiver facilities 11 and 14 are designed to connect the four-wire circuit to the telephone circuit through leads 2 WA. Since only one of the circuits are designed to transmit at any given time, it is the function of the terminal facilities 11 and 14 to connect its associated transmitter or receiver to the telephone line on a selective basis. For example, if the west terminal desires to transmit voice signals to the east terminal, a frequency shift keyed signal is transmitted by transmitter 16, received by receiver 13 and impressed upon terminal facility 11. The frequency shift keyed signal activates terminal facility 11 to disconnect telephone terminals 2 WA from transmitter 12 to prevent transmission from east to west terminal and simultaneously therewith establishes a connection between receiver 13 and telephone lines 2 WA for receipt of voice signals transmitted by the west terminal. For transmission of voice signals from the east terminal to the west terminal, a similar operation is performed with the terminal facility 14 reacting in an identical manner.

Terminal facility 11 is further provided with a local telephone connection in order to permit full duplex operation between the telephone line and the radio circuit. When connected through the local telephone leads, transmission and reception by the telephone circuit may occur simultaneously. When connected for full duplex operation, terminal facility 11 operates to disconnect the send and receive leads 4 WS and 4 WR from the normal telephone line 2 WA during the time in which the telephone equipment is connected through the local telephone lead. In cases where it is desired to transmit dialing information from the east terminal to the west terminal in order to establish connection with a predetermined location serviced by telephone equipment, the telephone facility is provided with means for transmitting dial pulses for dialing the desired telephone location. The dial pulse information is impressed upon the dial "M" lead which acts to key frequency shift keyed signals On and Off in accordance with the dial information from the east to the west terminal so as to establish connection between the east terminal and a specified telephone location served by the west terminal.

When the east terminal desires to transmit voice signals to the west terminal, a 20-cycle signal is impressed upon the 20-cycle supply lead of terminal facility 11, which signal is employed for activating the frequency shift keyed signal transmitted from east to west terminal to indicate desire of the east terminal to transmit voice signals to the west terminal. This same function may be performed at a location remote from the terminal facility 11 by connecting the remote circuit through the remote ring lead to the terminal facility 11 in order to actuate the frequency shift keyed signals.

When it is desired to provide four-wire to four-wire operation, as between two terminal facilities, a suitable signal is impressed upon the tandem lead of the terminal facility 11 which operates the terminal facility 11 in such a manner as to connect the 4 WR leads to the 2 WB leads and to connect the 4 WS leads to the 2 WA leads. This permits full duplex operation of the terminal facility 11.

The dial "E" lead provided in terminal facility 11 connects the dial pulses which may be received from the west terminal to the telephone network in order to establish connection by the dialing operation of the west terminal to a specified telephone location in the telephone network which may be connected to terminal facility 11.

It should be understood that terminal facility 14 in the system 10 of FIGURE 1 is substantially identical to the terminal facility 11 and both of these facilities operate in a like manner. Whereas the system of FIGURE 1 shows terminal facilities employed in a radio link telephone system, it should be understood that terminal facilities can be used in a variety of other systems, such as, for example, radio relay systems and telephone switchboard systems, to name just a few and the applications of the terminal facility should not be considered to be limited in any way to the exemplary embodiment of FIGURE 1.

Figure 2:
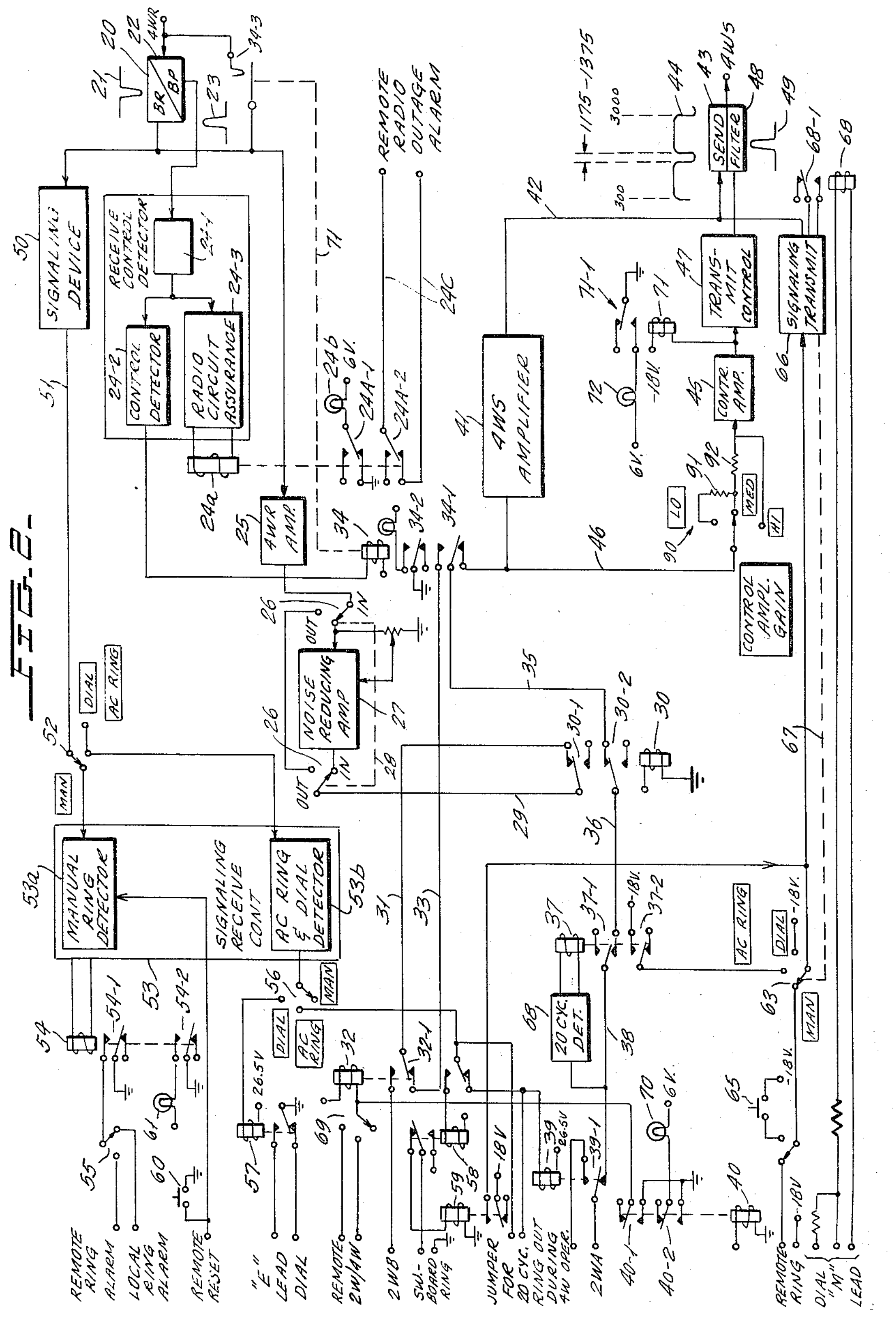
FIGURE 2 is a functional block diagram showing the terminal facility of FIGURE 1 in greater detail.

FIGURE 2 shows a functional block diagram of one of the terminal facilities 11 and 14, shown in FIGURE 1, and is designated as the terminal facility 11'.

The terminal facility 11' is provided with an input from the radio circuit designated 4 WR which is designed to to receive voice signals and frequency shift keyed signals from the west terminal. The voice signals received from the west terminal lie within the voice frequency band which is in the range of 300–3000 cycles per second. Within this frequency band a portion thereof is allocated to the frequency shift keyed control signals which are chosen to lie within the range of 1175–1375 cycles per second. Thus any voice signals which are transmitted will contain no information within this limited band width. Removal of this reserved band from the voice band in no way reduces the effectiveness and reliability of incoming voice signals. Thus control signalling constitutes an in-band signal employed to operate the terminal facility 11'. The signals in the reserve band are frequency shift modulation signals which are generated by a frequency shift oscillator [to be more fully described] which generates a 1225 c.p.s. signal during standby operation and which generates a 1310 c.p.s. signal during the send operation.

Thus, both the voice signals and the frequency shift keyed control signals are impressed upon the input terminal 4 WR which is connected in turn to the band pass and band reject filters 20 and 22, respectively. Band pass filter 22 passes signals lying within the reserved band from 1175–1375 c.p.s. The band pass filter has a characteristic curve 23. The voice signals are thus prevented from appearing at the output terminal of band pass filter 22 due to the attenuation imposed upon the remainder of the voice band by the filter. The control signals are then impressed upon the receive control detector 24.

The band reject filter 20 has a frequency characteristic curve 21 such that the entire voice band is passed by the band reject filter 20 with the exception of the frequency band from 1175–1375 c.p.s. The voice band signals are impressed upon the 4 WR amplifier 25. Amplifier 25 acts to provide suitable gain to the incoming voice signals so as to impress intelligible voice signals upon the telephone line in a manner to be more fully described. The amplifier 25 may be of the type described in application Serial No. 311,049 entitled, "Terminal Facility Receiver Amplifier," filed Sept. 24, 1963, by L. Carver and assigned to the assignee of the instant invention. It should be understood, however, that any other suitable amplifier may be employed. Amplifier 25 connects its output to a switch means 26 having first and second movable contacts which are mechanically connected, as shown schematically by the dotted line 28. In a first position, as shown in FIGURE 2, the switch connects the amplifier 25 to a noise reducing amplifier 27, while in a second or "out" position, switch 26 causes amplifier 25 to by-pass noise reducing amplifier 27. Amplifier 27 is designed to reduce noise present in the voice signal for the purpose of providing high quality voice signals which are impressed upon the telephone circuit. The voice signals received and amplified by gain control amplifier 25 are ultimately passed from the left-hand side of switch means 26 [whether noise reducing amplifier 27 is either in or out of the circuit] and is connected by means of lead 29, contacts 30–1 of relay 30, lead 31, contacts 32–1 of relay 32, lead 33, contacts 34–1 of relay 34, lead 35, contacts 30–2 of relay 30, lead 36, contacts 37–1 of relay 37, lead 38, and contacts 39–1 of relay 39, to the two-wire telephone terminal lead 2 WA.

In order to establish this connection, the function frequency of 1310 c.p.s. is impressed upon the receive control detector 24 which first amplifies the signal at 24–1 and connects the function frequency to control detector 24–2 and radio circuit assurance means 24-3. The control detector circuit 24–2 is designed to generate an output upon receipt of the function frequency of 1310 c.p.s. in order to energize relay 34. This causes the contact pair 34–1 to move to the position opposite to that shown in FIGURE 2 so as to establish connection between the telephone line lead 2 WA and the receive path described previously.

The radio circuit assurance means 24–3 receives whichever control frequency happens to be impressed upon the receive circuit at that given instant, simultaneously with the receipt by the control detector 24–2 of the same signal. Circuit 24–3 is provided with suitable means to be described subsequently, for generating a suitable D.C. control voltage which is impressed upon the relay means 24A. Relay 24A, when not energized, has its contact sets 24A–1 and 24A–2 in the position shown in FIGURE 2. In this position, contact set 24A–1 causes the indicator lamp 24B to have a closed circuit, thus energizing the lamp to indicate marginal operation of the receive circuit. When the control frequency signals are of suitable amplitude, circuit 24–3 generates a D.C. output level sufficient for energizing relay 24A. This causes the contact sets 24A–1 and 24A–2 to move to the reverse positions from that shown in FIGURE 2, deenergizing lamp 24B. Leads 24C may be employed for connecting the marginal operation indicating means to some remote point, if desired. Since the circuit 24–3 is connected through the circuit 24–1 to the band pass filter 22, it can be seen that circuit 24–3 always receives a control frequency regardless of whether voice signals are being received or not. Thus circuit 24–3 provides an indication of the condition of the receive channel at all times, whether it be during standby or function operation. In addition thereto, since the control signals are either 1310 c.p.s. or 1225 c.p.s., as opposed to the noise signal, a smoother D.C. level is produced by the circuit 24–3.

When the terminal facility 11' desires to operate so as to send voice signals from the telephone lead 2 WA to the radio circuit lead 4 WS, the path for this transmission extends from lead 2 WA through contact pair 39–1, lead 38, contact pair 37–1, lead 36, contact pair 30–2, lead 35, contact pair 34–1, 4 WS amplifier 41, lead 42 and band reject filter 43 to the radio circuit terminal 4 WS. The amplifier 41 provides suitable gain for the voice signals impressed upon the amplifier. The band reject filter means 43 acts to pass all signals in the voice band from 300 to 3000 c.p.s., while rejecting signals in the band from 1175–1375 c.p.s., which band is reserved for the control signals. The frequency characteristic of the band reject filter 43 is shown by the curve 44.

Connected in parallel with the send amplifier 41, is the control amplifier 45 which is connected to relay contact pair 34–1 through lead 46. The control amplifier 45 is a noise reducing amplifier substantially similar in function to the noise reducing amplifier 27. The output of amplifier 45 controls the series connected transmit control circuit 47 which functions to energize a signal of 1310 cycles per second when it is desired to transmit and which generates a signal of 1225 cycles per second frequency when the send circuit is in the standby condition. The control amplifier 45 acts to generate an output upon receipt of voice signals, which output causes the transmit control circuit 47 to change from the standby condition to the function frequency condition generating the signal of 1310 cycles per second frequency so as to condition the west terminal for receipt of voice signals from the east terminal. Both standby and function frequencies are transferred from transmit control circuit 47 to a band pass filter 48 which rejects all signals with the exception of those lying in the frequency band from 1175–1375 cycles per second. The frequency response curve of filter 48 is shown in 49. Thus during a send opeartion, signals at the output terminal WS are voice frequency signals lying in the 300–3000 c.p.s. frequency range, with the exception of the 1175–1375 frequency range, which reserved band contains either one of the two control frequencies (function or standby) which acts to condition the west terminal for appropriate operation. In order to control the gain of control amplifier 45, a series connected switch 50 is provided, which switch has low, medium and high positions for connecting suitable resistances 51 and 52 into the series circuit to control the operation of amplifier 45. Thus, when the terminal facility 11′ is in the send condition, voice signals are impressed from the 2 WA terminal simultaneously upon the send amplifier 41 and the parallel circuit containing series connected control amplifier 45 and transmit control circuit 47, placing voice signals upon the output terminal 4 WS simultaneously with the function control frequency of 1310 c.p.s. which will cause the remote terminal facility to establish connection from its 4 WR terminal to the telephone line 2 WA terminal in the same manner as previously described.

When the west terminal desires to contact a specified telephone location by dialing or A.C. ringing means, the west terminal transmits a signal which varies from 2150 cycles per second to 2450 cycles per second with the rate of variation being either 69 cycles per second or 240 cycles per second. The signal, which varies from 2150 cycles to 2450 cycles at either a 69-cycle per second or a 240-cycle per second rate is passed by the receive terminal 4 WR and filter 20, to be impressed upon the receiving circuit 50. Receive circuit 50 is a discriminator circuit which acts to extract either a 69-cycle per second signal or the 240-cycle per second signal, which is impressed through lead 51 and switch 52 to the ring detector circuit 53. With the switch 52 in the manual position, a 69-cycle per second signal is passed through switch 52 to the manual ring detector circuit **53*a* of detector circuit 53. The manual ring detector 53*a* may be a suitable bistable flip-flop circuit which is energized to the On state upon receipt of the 69-cycle per second signal for the purpose of energizing relay 54. This actuates the relay contacts 54–1 to connect the remote ring alarm terminal or the local ring alarm terminal through switch 55, thus requesting the west terminal to initiate a call either locally or at some remote point, depending upon the position of switch 55. Thus, when a signal is received by circuit 50, which signal varies from 2150 cycles per second to 2450 cycles per second at the rate of 69 cycles per second, this signal actuates the manual ring detector 53*a* to cause a call to be initiated. The signalling receive circuit 50** is provided with two separate discriminators; one tuned to 2400 cycles per second and one to 2150 cycles per second. Each of these circuits are designed to conduct during one-half cycle of the frequency through which it is tuned, thus producing at the output either a 69-cycle per second signal or a 240-cycle per second signal.

In the case of an A.C. ring-down or dialing operation, switch 52 is set to the dial or A.C. ring position. Receipt of a signal which varies from 2150 cycles per second to 2450 cycles per second at the rate of 240 cycles per second causes circuit 50 to pass a 240-cycle per second signal from lead 51 through switch 52 to the A.C. ring detector **53*b*, which may be a suitable flip-flop circuit which is designed to be energized by the 240-cycle per second signal. The energized state of circuit 53*b* is passed by means of switch 56 to either relay 57 for the dialing operation or to relay 39 for the A.C. ring operation causing either relay 57 to selectively open and close, to selectively place dial pulses on the "E" lead dial, to perform a dialing operation or, alternatively, to energize relay 39 connecting a 20-cycle supply [not shown] through the 20-cycle supply lead to the two-wire telephone lead 2 WA to initiate a call by the A.C. ring condition. The circuit 53*b* is an astable circuit which energizes either of the relays 57 or 39** whenever the 240-cycle per second signal is present and which deenergizes the relay upon the absence of the 240-cycle per second signal in order to generate the appropriate number of dialing pulses.

When a manual ring occurs, relay 54 operates contact set 54-2 to light lamp 61, indicating that a manual ring-down has been received. The reset of detector **53*a* is performed by depressing reset button 60 to reset the bistable flip-flop circuit 53*a***.

When it is desired to generate a manual ring-down at the east terminal, switch 63 is placed in the manual position and switch 64 is placed in either the remote or local position, depending upon which point is to initiate the manual ring-down. When in the local position, the ring push-button 65 is depressed to energize signalling transmit circuit 66. Circuit 66 is preferably comprised of an oscillator designed to operate at either 2150 or 2450 cycles per second, which oscillator is keyed by a suitable astable circuit to cause the oscillator to switch between 2150 and 2450 cycles per second operation at the rate of either 69 cycles per second or 240 cycles per second. In the case of manual operation, the shifting rate is at 69 cycles per second. With switch 63 in the manual position, mechanical coupling represented by the dash line 67 sets the multivibrator circuit 66 to operate at a 69-cycle per second rate so as to key the signalling transmit circuit output accordingly upon depression of manual ring push-button 65. When switch 63 is positioned in either the A.C. ring or dial position, this sets the multivibrator of circuit 66 to operate at 240 cycles per second by means of the mechanical coupling 67. With this switch 63 in the A.C. ring position, when an A.C. ring-down is desired, a 20-cycle supply is impressed upon a 20-cycle detector circuit 68, energizing relay 37 to move contact pair 37–2 so as to impress −18 volts upon the input of the signalling transmit circuit 66. This causes the output circuit 66 to be the signal varying from 2150–2450 cycles per second at the rate of 240 cycles per second so long as a 20-cycle signal is impressed upon detector 68. With switch 63 in the dial position, this places −18 volts on the signalling transmit circuit 66 which is conditioned to operate the output signal so as to vary it from 2150 to 2450 cycles per second at the rate of 240 cycles per second. Dialing information is placed on the dial "M" lead so as to energize relay 68 each time a dial pulse is received to close the contact pair 68–1 for deenergizing the signalling transmit circuit 66. Thus circuit 66 sends intermittent signals which simulates the dial pulses. The output of transmit circuit 66 is impressed through the filter 43 to the output terminal 4 WS.

When full duplex four-wire operation is desired, switch 69 is placed in the four-wire position and upon imposition of the appropriate voltage level upon either the 4 W or remote contact of switch 69, this energizes relay 32 to connect the four-wire receive amplifier 25 to the 2 WB terminal while the 2 WA terminal remains connected to the send amplifier 41 thus enabling full duplex operation. When tandem four-wire duplex operation is desired, relay 40 is energized to connect terminal 2 WB to the four-wire receive amplifier 25 by means of contact set 40–1; to light the tandem lamp 70 by means of contact set 40–2 so as to initiate tandem operation.

As previously described, when the terminal facility 11′ desires to send voice signals from the east terminal to the west terminal, the voice signals together with the function frequency of 1310 cycles per second appear at the output terminal via the amplifier 41 and band reject filter 43 and with the function frequency being impressed by the transmit control circuit 47 and the band pass filter 48 identification of the sending state is recognized by means of relay 71 which is energized by the control amplifier 45 when in the send condition, causing contact set 71–1 to connect the lamp 72 between 6 volts and ground potential. When the terminal facility 11′ is not sending voice signals, control amplifier 45 fails to energize relay 71 and acts to condition transmit control circuit 47 to generate a frequency signal of 1225 cycles per second, which signal is passed by the band pass filter 48 and remains on the 4 WS line as long as voice signals are not being sent from the terminal facility 11′ to the west terminal. Thus, one of the two control frequencies is always impressed upon the 4 WS terminal at any given instant with the standby frequency appearing at terminal 4 WS when no voice signal is being transmitted and the function frequency appears at terminal 4 WS when voice signals are being transmitted.

The control amplifier 45 accepts the incoming voice signals to be transmitted to the radio circuit and converts these signals to a suitable D.C. level. If the incoming voice signals to be transmitted are above a predetermined threshold level, the control amplifier 45 generates a suitable D.C. level which energizes indicator lamp 72 by means of energization of relay 71. This D.C. level is also impressed upon the transmit control circuit 47 which is normally conditioned to generate the standby frequency. However, upon receipt of a D.C. voltage above the threshold level, the transmit control circuit 47 becomes conditioned to transmit the function frequency signal which passes through filter 48, together with the voice signals which pass through filter 43 to the four-wire send line 4 WS.

Figure 3:
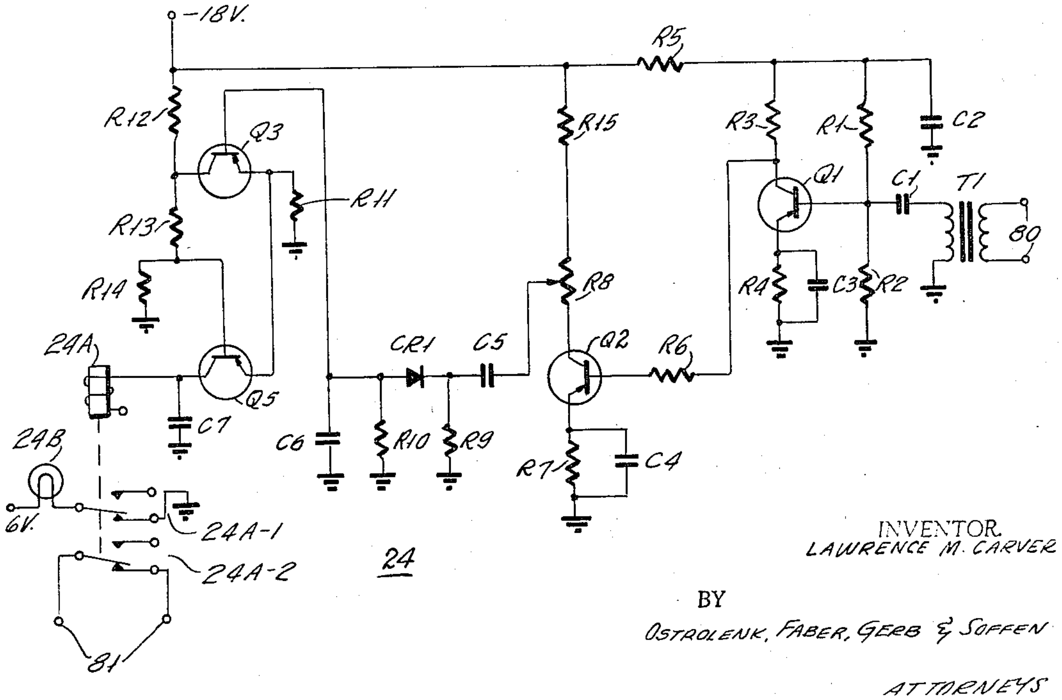
FIGURE 3 is a schematic diagram of the receive control detector means of FIGURE 2.

The amplifier stage 24–1 and radio assurance circuit 24–3 are shown in greater detail in FIGURE 3 and are comprised of input terminals 80 which are connected to the output of the band pass filter 22, shown in FIGURE 2. The control frequency which appears in the receive circuit at that time is transformer coupled from terminals 80 through a transformer means T1 to the base of transistor Q1 which is arranged as an amplifier circuit. The collector of transistor Q1 is connected to the base of transistor Q2 which is the first stage of the radio assurance circuit 24–3. The output is taken from resistor R8 connected to the collector of transistor Q2 and is capacitance coupled by C5 to diode means CR1. At this point the signal is half-wave rectified and filtered by capacitor C6. A D.C. voltage level is impressed upon the base of transistor Q3, which together with transistor Q5 forms a Schmitt trigger circuit. The trigger circuit is so designed as to make transistor Q3 normally conductive and transistor Q5 normally cut-off. When the incoming signals are above the threshold level, the D.C. voltage level developed by half-wave rectifier CR1 and capacitor C6 causes transistor Q3 to cut-off and transistor Q5 to conduct by an amount sufficient to energize relay 24A. The energization of relay 24A causes the contact sets 24A–1 and 24A–2 to move to the position opposite that shown in FIGURE 3, thus deenergizing the lamp 24B as well as opening the circuit across terminals 81, either of which circuit having adjustable arm 95 provides an indication [by their deenergized or open-circuited condition] that the receive circuit is operating above the marginal condition. If the control frequency input is near or below the threshold level of −45 dbm., the D.C. voltage developed at the terminal of CR1 and C6 causes transistor Q3 to remain conductive and transistor Q5 to remain cut-off, thus failing to energize relay 24A which will cause the contact sets 24A–1 and 24A–2 to remain in the position shown in FIGURE 3, to light lamp 24B to indicate marginal operation of the voice receive channel. Since the radio assurance circuit 24–3 continuously receives a control frequency, whether it be the standby or the function frequency, the circuit is enabled to provide a visible indication of the voltage level of the incoming circuit.

Figure 4:
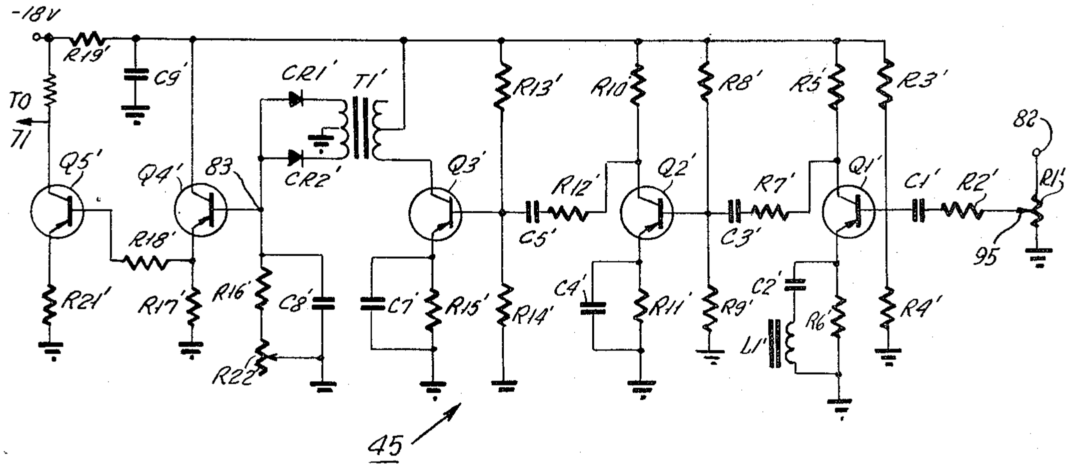
FIGURE 4 is a schematic diagram of the control amplifier means shown in FIGURE 2.
Figure 5:
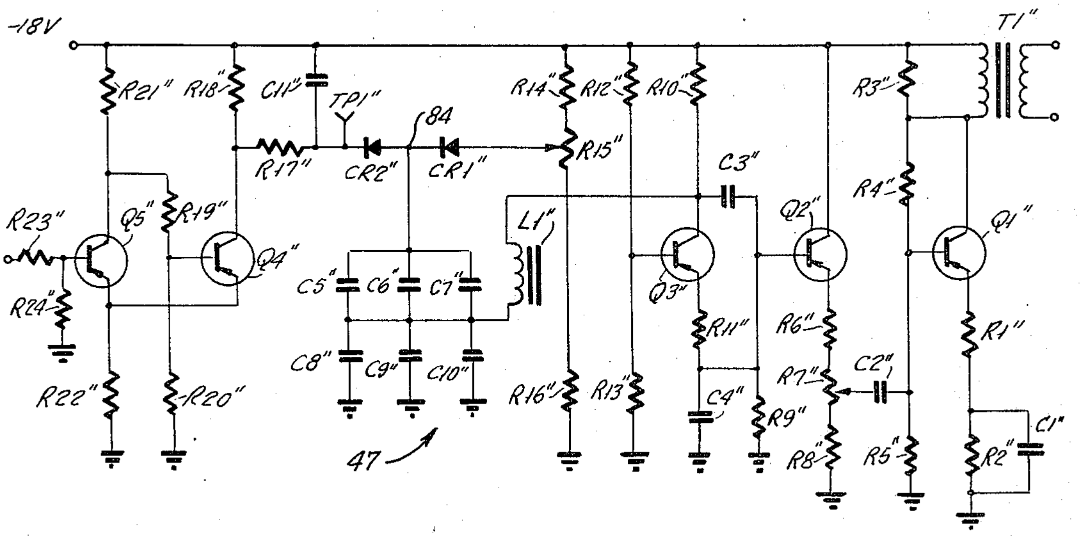
FIGURE 5 is a schematic diagram of the transmit control means of FIGURE 2.

The control amplifier 45 and transmit control circuit 47 are shown in greater detail in FIGURES 4 and 5 respectively. The control amplifier 45 is comprised of input means 82 for receiving the voice signals to be transmitted from the 2 WA lead which first passed through gain control switch 50 having low, medium and high gain settings. Potentiometer R1′ provides still further adjustment for the threshold level of control amplifier 45. Incoming voice signals are then coupled through resistor R2′ to the base of common emitter amplifier Q1. The emitter circuit of transistor Q1 contains a series resonant tuned circuit comprised of capacitor C2′, conductance L1′ and resistor R6′, to provide selectivity at about 1300 c.p.s. to allow the control circuit to favor voice signal over noise signals. The output from transistor Q1′ is taken from its collector electrodes and is amplified by transistor stages Q2′ and Q3′. The collector load of transistor Q3′ is transformer coupled by means T1′ to a full-wave rectifier comprised of diodes CR1′ and CR2′, which are provided for the purpose of charging capacitor C8′. The charging operation is characterized by an extremely fast rise time due to the low impedance path presented to capacitor C8′ by diodes CR1′ and CR2′. The discharge operation is characterized by an extremely slow decay time due to the high impedance discharge path provided by resistors R16′ and adjustable resistor R22′, which together are on the order of at least one-half megohm and providing a maximum adjustment of approximately ¾ of a megohm. When the incoming voice signals are above a preset threshold level, the D.C. voltage developed at terminal 83 causes emitter follower transistor Q4 to conduct, which in turn causes conduction of common emitter transistor Q5′ to conduct, driving the collector voltage of Q5′ to ground potential. This ground potential is connected to one terminal of relay means 71 causing the relay to become energized and pulling the contact sets 71–1 into the position opposite to that shown in FIGURE 2, for the purpose of energizing indicator lamp 72. The energization of indicator lamp 72 provides a visible indication of the fact that the four-wire send circuit is in the operative state.

The output condition of control amplifier 45 is also employed for the purpose of controlling the frequency generated by the transmit control circuit 47, shown in FIG. 5. The transmit control circuit 47 is connected to the output terminal or collector terminal of transistor Q5, shown in FIGURE 4, and the state of this transistor is impressed upon the base electrode of transistor Q5″ by means of resistor R23″. The transistors Q5″ and Q4″ form a Schmitt trigger circuit which normally receives a −18 volt D.C. level at its input terminal to maintain transistor Q5″ in the conduction state and transistor Q4″ in the cut-off state. When transistor Q4″ is cut-off its collector terminal is near the negative bias level causing the series connected diodes CR1″ and CR2″ to be forward biased. This causes the terminal 84 between CR2″ and CR1″ to be substantialy at ground potential, causing the capacitor C5″–C7″ to effectively be connected in parallel with capacitors C8″–C10″. One terminal of each of the capacitors C5″–C10″ are connected in common with the reactor L1″ to form a tuned circuit arranged to resonate at 1225 cycles per second. This series tuned circuit, together with transistor Q3″, forms a frequency shift oscillator which operates at the standby frequency of 1225 cycles per second. The frequency is taken from the collector electrode of transistor Q3″, is first amplified by emitter follower transistor Q2″ and is RC coupled by means of resistors R6″, adjustable resistor R7″ and capacitance C2″, to the base of transistor Q1″. Adjustable resistor R7″ permits an output level adjustment. The amplified signals are taken from the collector electrode of transistor Q1″ and is transformer coupled by T1 to the output terminals 84. The outut terminals 84 are connected to the input of the band pass filter 48, shown in FIGURE 2, which then passes the signals to the four-wire send circuit for reception by the radio circuit.

During the send condition, the collector electrode of transistor Q5′ of control amplifier 45 in FIGURE 4 is at ground potential, causing transistor Q5″ of transmit control circuit 47 in FIGURE 5 to be cut-off and causing transistor Q4″ to conduct. The collector electrode of transistor Q4″ approaches ground potential so as to back bias the diodes CR2″ and CR1″. This causes the capacitors C5″–C7″ to be effectively disconnected from the capacitors C8″–C10″. The capacitors C8″–C10″, together with reactor L1″, form a series resonant circuit tuned to operate at the frequency of 1310 cycles per second. This series resonant path, together with transistor Q3″ forms an oscillator circuit which generates the function frequency of 1310 cycles per second, which is ultimately generated at the output terminals 84 in the same manner as previously described.

Reviewing the operation of control amplifier 45, together with transmit control circuit 47, it can be seen that voice signals of a level above the preset threshold level causes the amplifier 45 to generate an output substantially at ground potential to energize the send circuit indicator lamp 72 to indicate the fact that the terminal facility 11′ is in the send condition. The ground potential is also impressed upon the transmit control circuit 47 causing the circuit to generate an output frequency at 1310 cycles per second, which is transmitted to the remote radio circuit and is identified at that point as a send condition of the terminal facility 11′, thus conditioning the remote radio circuit to place itself in readiness for receiving voice signals. If the voice signals are below the preset threshold level, or if only noise or no signal is present on the telephone line, the control amplifier circuit 45 generates a negative D.C. output voltage, causing the four-wire send lamp to be deenergized and further, causing the transmit control circuit 47 to generate the standby frequency of 1225 cycles per second. Thus, if the operator is sending voice signals and the four-wire send lamp fails to light, this provides an immediate indication that the voice signals are below the preset threshold level, enabling the operator to take immediate corrective measures.

It can therefore be seen that the instant invention provides novel control circuitry for establishing marginal control of the receive and send circuits and providing means for automatically generating the function frequency signal during a send operation as soon as the voice signals are transmitted to markedly improve the overall operation of the terminal facility, as well as providing suitable visible indications of the state of the terminal facility to send and receive channels.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Terminal means for connecting a four-wire radio circuit receiving signals from a remote location comprising a first channel for receiving voice signals and standby and function signals from the radio circuit; said standby control signal being received when the remote location is in standby condition and said function control signal being received when the remote location is transmitting voice signals; a second channel for sending signals to control the radio circuit; a third channel for connecting said terminal means to a two-wire telephone line; normally disabled relay means including first contact means for connecting said third channel to said second channel; detector means connected to the input of the first channel energizable by the function control signal of a first frequency to energize said relay means; said relay means including second contact means; said relay means when energized, operating said first and second contact means for disconnecting said third channel from said second channel and connecting said third channel to said first channel; first filter means coupled between the radio circuit and the input of said detector means; said first channel including second filter means and amplifier means connected to the output of said second filter means; said second filter means passing signals in the voice band except for a narrow band of frequencies to said amplifier means; said function control signal of said first frequency and said standby control signal of a second frequency lying in said narrow band; said amplifier means including means for automatically adjusting the gain of the amplifier under control of changes in input signal level to provide output signals of suitable amplitude; said first filter means passing signals of frequencies lying only in said narrow band; second detector means connected to the output of said first filter means to receive said first and second control signal frequencies; said second detector means including means for providing a visible indication when the level of incoming signals are below a predetermined threshold.

2. The device of claim 1 wherein said second detector means comprises an amplifier stage; means for rectifying signals received from said amplifier stage; means for being charged by the retcified voltage; trigger means for deenergizing said visible indication means when the voltage level developed by said means being charged is above a preset threshold level.

3. The device of claim 2 wherein said means being charged is a capacitor.

4. The device of claim 2, wherein said trigger means is a Schmitt trigger circuit.

5. The device of claim 2 wherein said visible indicating means includes relay means; an indicator lamp; bias means; a contact set controlled by said relay means for connecting said bias means to said indicator lamp when said relay is deenergized and for disconnecting said bias means from said indicator lamp when said relay means is energized; said relay being controlled by the output of said trigger means.

6. The device of claim 1 wherein said second channel comprises first control means for receiving voice signals from said telephone line; said first control means having means converting the incoming signals to a first D.C. voltage level when said incoming signals are above a preset threshold level and to a second D.C. voltage level when said incoming signals are below said threshold level; transmit control means including a trigger circuit having two states and oscillator means controlled by said trigger circuit; said oscillator means including an adjustable circuit tuned to a predetermined frequency to operate said oscillator at a first frequency when said trigger circuit is in a first state and a second frequency when said trigger circuit is in a second state.

7. In a terminal circuit for connecting a four-wire radio circuit to a two-wire telephone circuit a first channel comprising an input for receiving voice and control signals from said radio circuit; receive amplifier gain control means in said first channel means automatically adjustable under control of variable level input signals for amplifying incoming signals to a pretermined level suitable for telephone receiption; a second channel for sending voice signals to said radio circuit; a third channel for receiving signals from and sending signals to a telephone channel; normally disabled relay means for connecting said third channel to said second channel; detector means connected to said first channel input and being tuned to a narrow frequency band within the voice band for receiving control signals to energize said relay means; said relay means when energized connecting said third channel to said first channel; said second channel comprising first control means for receiving voice signals over the entire voice band from said telephone line; said first control means having means converting the incoming voice signals to a first D.C. voltage level when said incoming signals are above a preset threshold level and to a second D.C. voltage level when said incoming signals are below said threshold level; transmit control means including a trigger circuit coupled to said first control means and having two states controlled by the output of said first control means; oscillator means controlled by said trigger circuit; said oscillator means including an adjustable circuit tuned to operate said oscillator at a first frequency when said trigger circuit is in a first state and at a second frequency when said trigger circuit is in a second state; said first and second frequencies generated by said oscillator lying in said narrow band.

8. The device of claim 7 including indicator means energized by said control means when the incoming signals are above said preset level to indicate the send condition for the terminal facility.

9. The device of claim 7 with said control means including amplifier means having a tuned circuit operative in the range from 1225–1310 c.p.s. enabling said control means to favor incoming voice signals over noise signals.

10. The device of claim 9 further comprising means connected to said amplifier means for rectifying incoming voice signals received from said amplifier means; capacitor means for storing the voltage developed by said rectifying means, switch means for generating said first and second D.C. voltage levels when said stored voltage is respectively above and below said preset threshold level.

References Cited by the Examiner

UNITED STATES PATENTS

| | | | |
|---|---|---|---|
| 1,968,106 | 7/1934 | Thierbach | 325—62 X |
| 2,065,826 | 12/1936 | Roosenstein et al. | 325—62 |
| 2,407,846 | 8/1946 | O'Brien | 326—64 X |
| 2,671,166 | 3/1954 | O'Brien | 325—64 X |
| 3,070,672 | 12/1962 | Haas | 179—175.31 |
| 3,104,356 | 8/1963 | Hedger | 325—64 X |
| 3,174,100 | 3/1965 | Orr | 179—170.4 X |
| 3,225,348 | 12/1965 | Gilman | 340—351 |

DAVID G. REDINBAUGH, *Primary Examiner.*

B. V. SAFOUREK, *Assistant Examiner.*